UNITED STATES PATENT OFFICE.

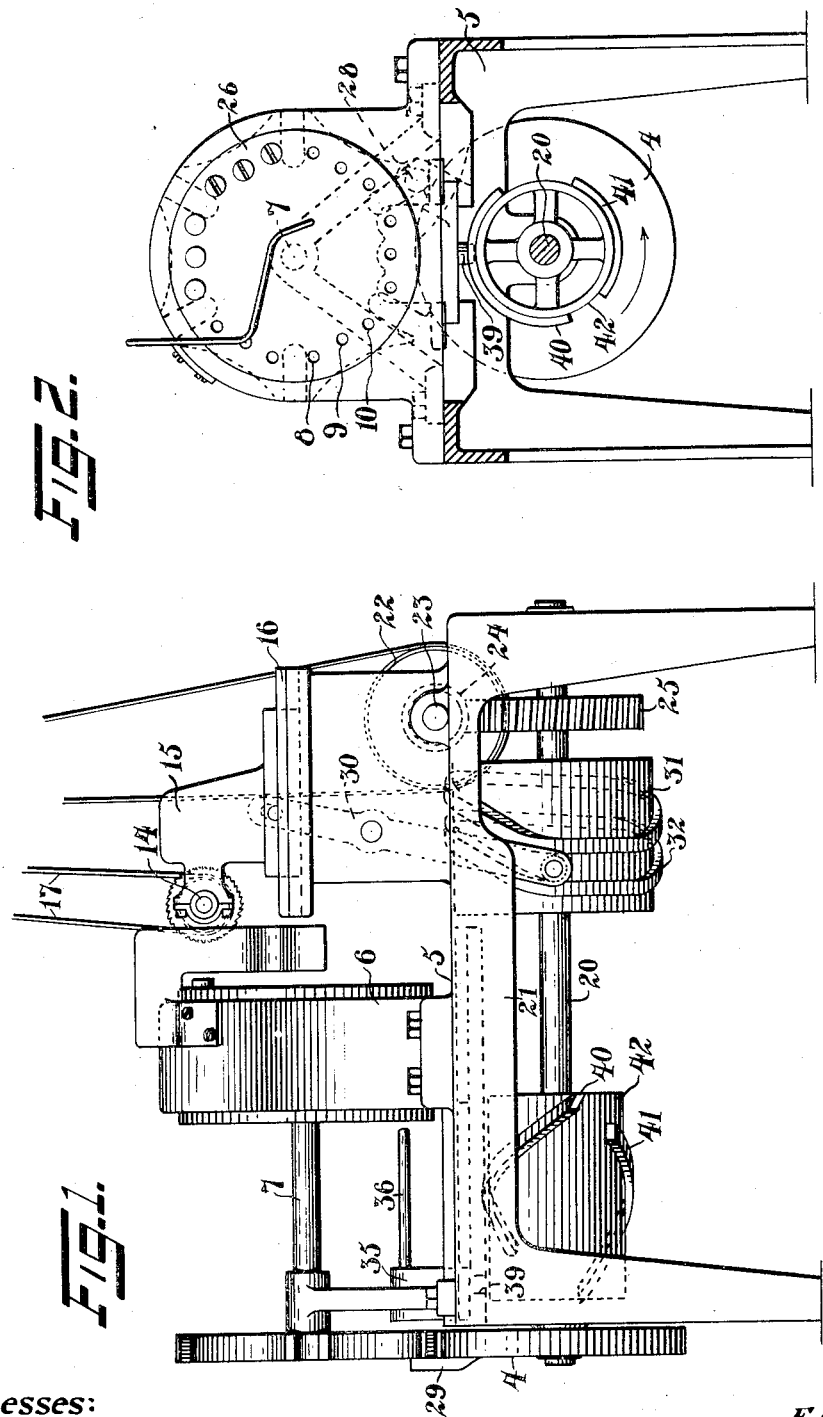

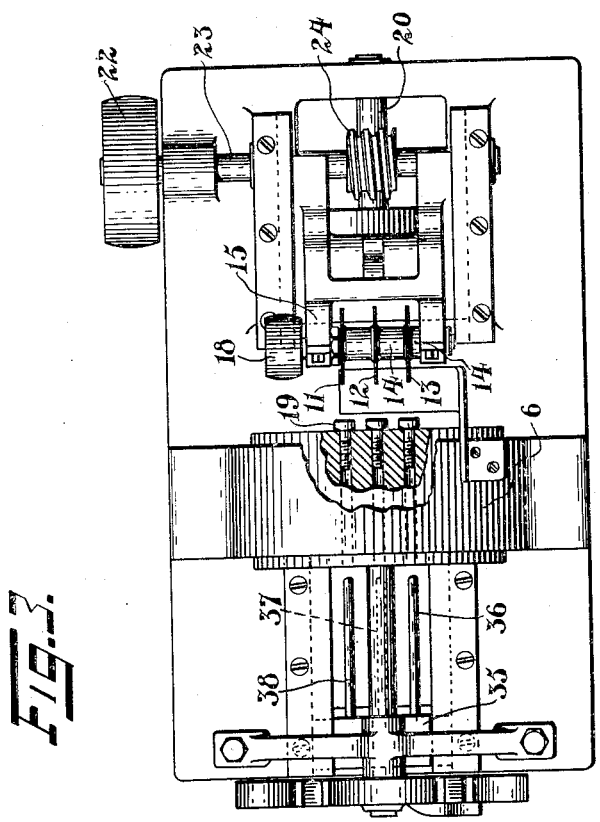

EDWIN C. HENN, OF CLEVELAND, OHIO, ASSIGNOR TO NATIONAL-ACME MANUFACTURING COMPANY, OF CLEVELAND, OHIO, A CORPORATION OF OHIO.

SCREW-SLOTTING MACHINE.

No. 896,537.  Specification of Letters Patent.  Patented Aug. 18, 1908.

Application filed August 30, 1906. Serial No. 332,575.

*To all whom it may concern:*

Be it known that I, EDWIN C. HENN, a citizen of the United States, residing in Cleveland, in the county of Cuyahoga and State of Ohio, have invented certain new and useful Improvements in Screw-Slotting Machines, of which the following is a specification.

This invention has reference to machines for slotting the heads of articles such as screws of various kinds, wherein a transverse slot is cut in the end or head of the article. Letters Patent on a machine for the same purpose were granted to me March 11th, 1902, Number 694,965; in which machine the screws are placed in sockets in the face or end of a head or carrier, the sockets being arranged in pairs in radial alinement.

One of the objects of the present invention is to provide an improved organization for carrying the screws wherein the socket portions of the head are arranged in a line extending transversely, or tangential, instead of radial. In the said patent, the head carrying screws is shifted endwise toward and from the saws or cutters. In the present invention, means are provided for bodily moving the saws or cutters to and from the work that is held stationary in the head during such operation.

In the accompanying drawings, Figure 1 is a front elevation of a machine embodying my invention. Fig. 2 is an end elevation of the same, and Fig. 3 shows the machine in plan view, partly in section.

In the machine illustrated, the table or frame member 5 rotatably supports a head or carrier 6 fast to a shaft 7, by which the head is rotated. Suitable means are provided for rotating the head by an intermittent or step-by-step advancing movement. The head 6 is provided with means for supporting the sets of screws or other blanks, in which sets the articles are in alinement; and the line of the screws is perpendicular to a radius, instead of radial as heretofore constructed. In the machine shown in the drawings, there are six sets of socket portions, each comprising three sockets 8, 9 and 10. The arrangement of these holders is tangential to a circle passing through the intermediate socket 9 of each set. With this construction, the head is intermittently advanced six times for each revolution.

A set or gang of cutter members, such as saws 11, 12 and 13, are mounted on a single shaft 14, which shaft is rotatably supported in a block 15. This block is slidable in horizontal ways 16 on the machine, moving parallel with shaft 7. The saw shaft 14 is driven by belt 17 passing around a pulley 18 on the shaft; the belt engaging a suitable pulley overhead, the reciprocation of the saws and pulley will not affect materially the tension of the belt. When the head is locked by suitable means in one of its six positions, and the member carrying the gang of saws is advanced toward the head, each saw will cut the desired slot in one of the screws 19 that have been inserted in the socket portions of the head. The saw carrier or block is thereupon caused to retreat, and the head advanced to bring the next three screws to the operating position, and then locked in this position. Thereupon, the saw gang is again advanced and the next three screws are operated upon simultaneously by the saws. In the course of its movement, the head may be engaged by suitable ejecting mechanism, whereby the slotted screws are removed from their socket portions, after the insertion of new blanks to be engaged by the gang of saws.

In the machine illustrated, a driving shaft 20 is mounted in suitable bearings in the machine below the table 21 and driven from a driving pulley 22 fast on a shaft 23, by means of a worm 24 on the latter shaft that engages a worm wheel 25 fast on the shaft 20. The shaft 7 secured to the head 6 is intermittently advanced from the continually rotating shaft 20 by means of a star wheel 26 fast on the shaft 7, that is engaged by a pin 28 extending from an arm 29, that projects from a crank disk 4, fast on the shaft 20. At each revolution of the shaft 20 and crank pin 28, the star wheel is advanced the angular distance of the several slots of the star wheel in the usual manner of the Geneva stop movement.

At each revolution of the shaft 20, the carrier 15 of the gang saws is given a complete reciprocation, and being actuated through the medium of a lever 30 pivoted on the machine and engaging a cam slot 31 carried by a cam drum 32, secured on the shaft 20. The lever and cam arrangement is arranged to bring the saw into operation after the star wheel has advanced the head and locked it in position; the gang saw being thereupon advanced to cut the slots and then retracted, and retained in such position until the head has been advanced to bring the next set of screws into position for operation.

Suitable ejecting means may be provided; in the machine illustrated comprising a holder 35 slidable along the machine bed and carrying three rods 36, 37 and 38, positioned to enter three of the socket portions 8, 9 and 10 when the latter are in their lowermost position. The ejector is operated by having a depending lug 39 engaged by cam straps 40 and 41, fast on a drum 42, carried by the shaft 20. By this arrangement of the socket portions of the holder in alinement and extending horizontally in the operative position, the work of feeding the machine, that is, placing the screws in position for slotting is greatly facilitated, as the operator can very rapidly place the screws in the sockets, and at the same time inspect the blanks to ascertain their condition or fitness for use. Furthermore, the blanks are placed in the head in practically the same circumferential position. At the same time, the screws can be operated upon by the gang saws very readily, the saw gang being advanced to the head to operate upon the work and then retracted; which arrangement is a great improvement on the practice of causing the head carrying the work, to move toward and from the cutter member. Since the saws are not advanced across the screws, or moved transversely to their axis, and the head is not given a reciprocating movement, special means for retaining the screws in the sockets is not necessary; but if advisable, means may be readily provided for retaining the screws or other blanks in the sockets, such as the screw bolts shown in the said patent. Moreover, by reason of the organization shown and described the cutters slot the blanks diametrically of the head, in consequence of which there is no tendency to rotate the head, so that chattering of the parts is avoided.

Having thus described my invention, I claim:

In a machine of the class specified, the combination of a blank carrying head having a circular series of sets of blank carrying sockets in the face of said member, the sockets of each set in alinement and extending perpendicular to the radius of said head, a cutter carrying member, and cutters carried thereby, one of said members movable toward and from the other, the organization of the cutters and blank carrying sockets being such that the cutters will cut the blanks diametrically of the blank carrying member.

EDWIN C. HENN.

Witnesses:
O. S. WERNTZ,
E. C. WOOLGAR.